United States Patent
Clifford et al.

(10) Patent No.: US 11,841,878 B2
(45) Date of Patent: Dec. 12, 2023

(54) AUTOMATIC VERTICAL PARTITIONING OF FACT TABLES IN A DISTRIBUTED QUERY ENGINE

(71) Applicant: International Business Machines Corporation, Armonk, NY (US)

(72) Inventors: Austin Clifford, Glenageary (IE); Hemant Asandas Bhatia, Olathe, KS (US); Ilker Ender, Dublin (IE); Mara Elisa de Paiva Fernandes Matias, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 17/460,362

(22) Filed: Aug. 30, 2021

(65) Prior Publication Data

US 2023/0082010 A1    Mar. 16, 2023

(51) Int. Cl.
*G06F 16/27*    (2019.01)
*G06F 16/22*    (2019.01)
*G06F 16/2455*    (2019.01)
*G06F 16/2458*    (2019.01)

(52) U.S. Cl.
CPC ........ *G06F 16/278* (2019.01); *G06F 16/2282* (2019.01); *G06F 16/2471* (2019.01); *G06F 16/24554* (2019.01)

(58) Field of Classification Search
CPC .................................................. G06F 16/278
USPC ........................................................ 707/736
See application file for complete search history.

(56) References Cited

U.S. PATENT DOCUMENTS

| | | | |
|---|---|---|---|
| 7,562,090 B2 | 7/2009 | Maring | |
| 8,620,888 B2 | 12/2013 | Basu | |
| 9,805,107 B2 | 10/2017 | Gislason | |
| 2006/0161517 A1* | 7/2006 | Bhattacharjee | ....... G06F 16/283 |
| 2013/0275365 A1* | 10/2013 | Wang | .................... G06F 16/283 |
| | | | 707/E17.014 |
| 2015/0347622 A1 | 12/2015 | Li | |
| 2016/0328429 A1 | 11/2016 | Lipcon | |
| 2018/0046550 A1* | 2/2018 | Chang | ............... G06F 16/24544 |

(Continued)

OTHER PUBLICATIONS

"Improving performance using partitions", Cloudera, Printed Aug. 5, 2021, 3 pages, <https://docs.cloudera.com/HDPDocuments/HDP3/HDP-3.0.0/performance-tuning/content/hive_improving_performance_using_partitions.html>.

(Continued)

*Primary Examiner* — Muluemebet Gurmu
(74) *Attorney, Agent, or Firm* — Edward J. Wixted, III

(57) ABSTRACT

In an approach for automatic vertical partitioning of fact tables in a distributed query engine a processor analyzes a sample end-user workload of queries to extract filter predicates associated with each of multiple fact tables relating to a big data store. A processor, for each fact table, and for each column in the fact table to which a filter predicate is applied and where coarsification is required, generates a candidate partitioning expression incorporating an adjustment to a coarsification function based on a data distribution of values in the column. A processor scores the candidate partitioning expressions for each fact table based on cost data relating to the sample end-user workload and selects one or more candidate partitioning expressions to optimize partitioning of each fact table with each partition data being placed in a separate directory in a distributed file system.

25 Claims, 10 Drawing Sheets

(56) References Cited

U.S. PATENT DOCUMENTS

| | | |
|---|---|---|
| 2019/0229992 A1 | 7/2019 | Margoor |
| 2019/0266154 A1 | 8/2019 | Wu |
| 2021/0081453 A1* | 3/2021 | Eadon ............... G06F 16/90335 |
| 2021/0200737 A1* | 7/2021 | Yan ....................... G06F 16/217 |
| 2022/0019589 A1* | 1/2022 | May .................... G06F 16/2282 |

OTHER PUBLICATIONS

Mell et al., "The NIST Definition of Cloud Computing", National Institute of Standards and Technology, Special Publication 800-145, Sep. 2011, 7 pages.

* cited by examiner

AUTOMATIC VERTICAL PARTITIONING OF FACT TABLES IN A DISTRIBUTED QUERY ENGINE

BACKGROUND

The present invention relates generally to the field of query engines for enterprise-level big data workloads, and more particularly to vertical partitioning of fact tables in a query engine.

Hadoop (Hadoop is a trademark of Apache Software Foundation) provide a platform for big data in the form of a network of many computers that solve problems involving massive amounts of data and computation. The Hadoop platform includes a storage part, Hadoop Distributed File System (HDFS), and a processing part.

Structured Query Language (SQL) on Hadoop (SQL-on-Hadoop) engines are analytical tools that combine established SQL querying with the Hadoop data framework elements. SQL-on-Hadoop engines have the ability to directly reference data in external storage and provide the capability to analyze data where it sits using existing complex SQL and business intelligence tooling.

SQL-on-Hadoop engines (such as, for example, Apache Hive (Apache Hive is a trademark of Apache Software Foundation)) provide the ability to partition a fact table based on one or more columns, referred to as vertical partitioning. Different data partitions are placed in separate directories on the HDFS. When the SQL-on-Hadoop engine eliminates unneeded data directories and files during query processing, this is referred to as partition elimination. The more files eliminated during query processing the less data that needs to be scanned and the faster the queries can be executed.

One typical use case pattern in big data processing is the scanning of large fact tables with some filtering applied so that a subset of the table is retrieved, or the joining of fact tables with smaller dimension tables. The filtering of the data is done through predicates to limit the number of rows returned by a query. There can be local and join predicates and partition elimination can occur for both local and join predicates.

When there are multiple partitioning columns, subdirectories are created for each additional partitioning column. Since each distinct value of a partitioning column creates a new directory on HDFS, this can result in a proliferation of smaller files if there are either too many partitioning columns or each partitioning column has a lot of distinct values. The sheer amount of metadata associated with these partitions puts pressure on various components in the big data system including the HDFS name node as well as resulting in files/splits that are too small for optimal scan-time performance. For this reason, it is not recommended to partition on too many columns or over columns with a lot of distinct values. A practical upper limit is in the order of 10,000 partitions per table.

In practice, even for a single table, partitioning is a complex activity that administrators often struggle with. In many cases, the administrator will simply partition a large fact table on an arbitrarily selected candidate date column, for example, a transaction date or a system date. Often times, this arbitrary partitioning scheme in not appropriate and results in a poorly performing query workload.

SUMMARY

According to an aspect of the present invention there is provided a computer-implemented method for automatic vertical partitioning of fact tables in a distributed query engine, comprising: analyzing a sample end-user workload of queries to extract filter predicates associated with each of multiple fact tables relating to a big data store; for each fact table, for each column in the fact table to which a filter predicate is applied and where coarsification is required, generating a candidate partitioning expression incorporating an adjustment to a coarsification formula based on a data distribution of values in the column; scoring the candidate partitioning expressions for each fact table based on cost data relating to the sample end-user workload; and selecting one or more candidate partitioning expressions to optimize partitioning of each fact table with each partition data being placed in a separate directory in a distributed file system.

This provides the advantage of implementing partitioning with an optimal fit for the prevailing query workload and which generates an optimal number and distribution of table partitions.

Generating a candidate partitioning expression may include: determining a coarsification formula to reduce a number of distinct values for the filter predicate; fitting a distribution model to data values of the sample in the column; and generating a candidate partitioning expression in the form of a combination of the coarsification formula and an equation of the distribution model. The coarsification formula may include converting column data types to a numeric equivalent data type suitable for applying a partitioning expression.

Scoring the candidate partitioning expressions may be iterative where single partitioning expressions and compound partitioning expressions involving multiple columns are evaluated to choose an optimal partitioning expression on each fact table for the overall workload.

The method may include, for each column in the fact table, determining if coarsification is required by examining a cardinality of the column to conform with a configured maximum number of partitions per fact table.

Analyzing a sample end-user workload of queries to extract filter predicates associated with each of multiple fact tables relating to a big data store may include: obtaining a detailed dissection of queries and their metadata including a structured list of filter predicates that feature in a query; harvesting a full set of filter predicates across the workload; and augmenting with an estimated query cost and a priority for each filter predicate.

Fitting a distribution model to data values of the sample in the column may include fitting quantile statistical data with a representative mathematical model in order to obtain an equation that can be incorporated in the candidate partitioning expression. The method may include as part of the fitting of a distribution model to data values in a column, calculating a goodness-of-fit measure and incorporating the goodness-of-fit measure in the scoring of candidate partitioning expressions.

Cost data may be obtained by applying the candidate partitioning expressions to each of the queries across the sample end-user workload, and calculating an overall cost for each query for each candidate partitioning expression.

The method may include obtaining cost data for queries from the distributed query engine's query optimizer statistics consisting of one or more of the group of: an input/output cost, a communications cost, and a processor cost, and configuring weightings of cost data for scoring the candidate partitioning expressions.

Scoring the candidate partitioning expressions may be based on cost data in combination with a priority of a query as categorized by a workload manager, and a proportion of queries that benefit from the candidate partitioning expression.

The method may include providing a fixed name for a selected partitioning expression and providing a version label for the partitioning expression that is applied as the partitioning expression is refined. A partitioning expression may be refined by adjusting the coarsification formula.

The method may include dynamically redefining a partitioning expression by determining if an existing selected partitioning expression is not meeting a configured performance target, invoking the automatic partitioning method to select a candidate partitioning expression for a table.

An existing partitioning expression may be determined as not meeting a configured performance target if partition elimination is not occurring or if a table exceeds a threshold number of partitions.

According to another aspect of the present invention there is provided a computer-implemented method for automatic vertical partitioning of fact tables in a distributed query engine, comprising: an automatic partitioning method including: for each fact table, for each column in the fact table to which a filter predicate is applied and where coarsification is required, generating a candidate partitioning expression incorporating an adjustment to a coarsification formula based on a data distribution of values in the column; selecting one or more candidate partitioning expressions as a partitioning scheme for a table to optimize partitioning of each fact table with each partition data being placed in a separate directory in a distributed file system; and dynamically redefining the partitioning scheme for a fact table by determining if an existing selected partitioning expression is not meeting a configured performance target and invoking the automatic partitioning method to select an updated partitioning scheme for a table.

This provides the advantage of automatically adjusting a partitioning schema based on the prevailing query patterns and partition thresholds but without necessitating wholesale repartitioning to achieve this.

An existing partitioning expression may be determined as not meeting a configured performance target if partition elimination is not occurring to a required level or if a table exceeds a threshold number of partitions.

The method may include providing a fixed name for a selected partitioning expression and providing a version label for the partitioning expression that is applied as the partitioning expression is refined by adjusting the coarsification formula.

According to a further aspect of the present invention there is provided a system for automatic vertical partitioning of fact tables in a distributed query engine, comprising: a processor and a memory configured to provide computer program instructions to the processor to execute the function of the components: an end-user workload analysis component for analyzing a sample end-user workload of queries to extract filter predicates associated with each of multiple fact tables relating to a big data store; a candidate partitioning expression component for, for each fact table, for each column in the fact table to which a filter predicate is applied and where coarsification is required generating a candidate partitioning expression incorporating an adjustment to a coarsification function based on a data distribution of values in the column; a selecting component including a scoring component for scoring the candidate partitioning expressions for each fact table based on cost data relating to the sample end-user workload, and selecting one or more candidate partitioning expressions to optimize partitioning of each fact table with each partition data being placed in a separate directory in a distributed file system.

The candidate partitioning expression component may include: a coarsification formula component for determining a coarsification formula to reduce a number of distinct values for the filter predicate; a distribution fitting component for fitting a distribution model to data values of the sample in the column; and a combining component for generating a candidate partitioning expression in the form of a combination of the coarsification formula and an equation of the distribution model.

The coarsification formula component may include a converting component for converting column data types to a numeric equivalent data type suitable for applying a partitioning expression.

The scoring component may be iterative where single partitioning expressions and compound partitioning expressions involving multiple columns are evaluated to choose an optimal partitioning expression on each fact table for the overall workload.

The end-user workload analysis component may include: a query information component for obtaining a detailed dissection of queries and their metadata including a structured list of filter predicates that feature in a query; a predicate harvesting component for harvesting a full set of filter predicates across the workload; and a predicate augmenting component for augmenting each filter predicate with an estimated query cost and a priority.

According to a further aspect of the present invention there is provided a system for automatic vertical partitioning of fact tables in a distributed query engine, comprising: a processor and a memory configured to provide computer program instructions to the processor to execute the function of the components: an automatic partitioning component configured to: for each fact table, for each column in the fact table to which a filter predicate is applied and where coarsification is required, generate a candidate partitioning expression incorporating an adjustment to a coarsification formula based on a data distribution of values in the column; select one or more candidate partitioning expressions as a partitioning scheme for a table to optimize partitioning of each fact table with each partition data being placed in a separate directory in a distributed file system; and an automatic partition redefining component for dynamically redefining the partitioning scheme for a fact table by determining if an existing selected partitioning expression is not meeting a configured performance target and invoking the automatic partitioning method to select an updated partitioning scheme for a table.

According to a further aspect of the present invention there is provided a computer program product for automatic vertical partitioning of fact tables in a distributed query engine, the computer program product comprising a computer readable storage medium having program instructions embodied therewith, the program instructions executable by a processor to cause the processor to: analyze a sample end-user workload of queries to extract filter predicates associated with each of multiple fact tables relating to a big data store; for each fact table, for each column in the fact table to which a filter predicate is applied and where coarsification is required, generate a candidate partitioning expression incorporating an adjustment to a coarsification function based on a data distribution of values in the column; score the candidate partitioning expressions for each fact table based on cost data relating to the sample end-user workload; and select one or more candidate partitioning expressions to optimize partitioning of each fact table with each partition data being placed in a separate directory in a distributed file system.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

Figure 1:
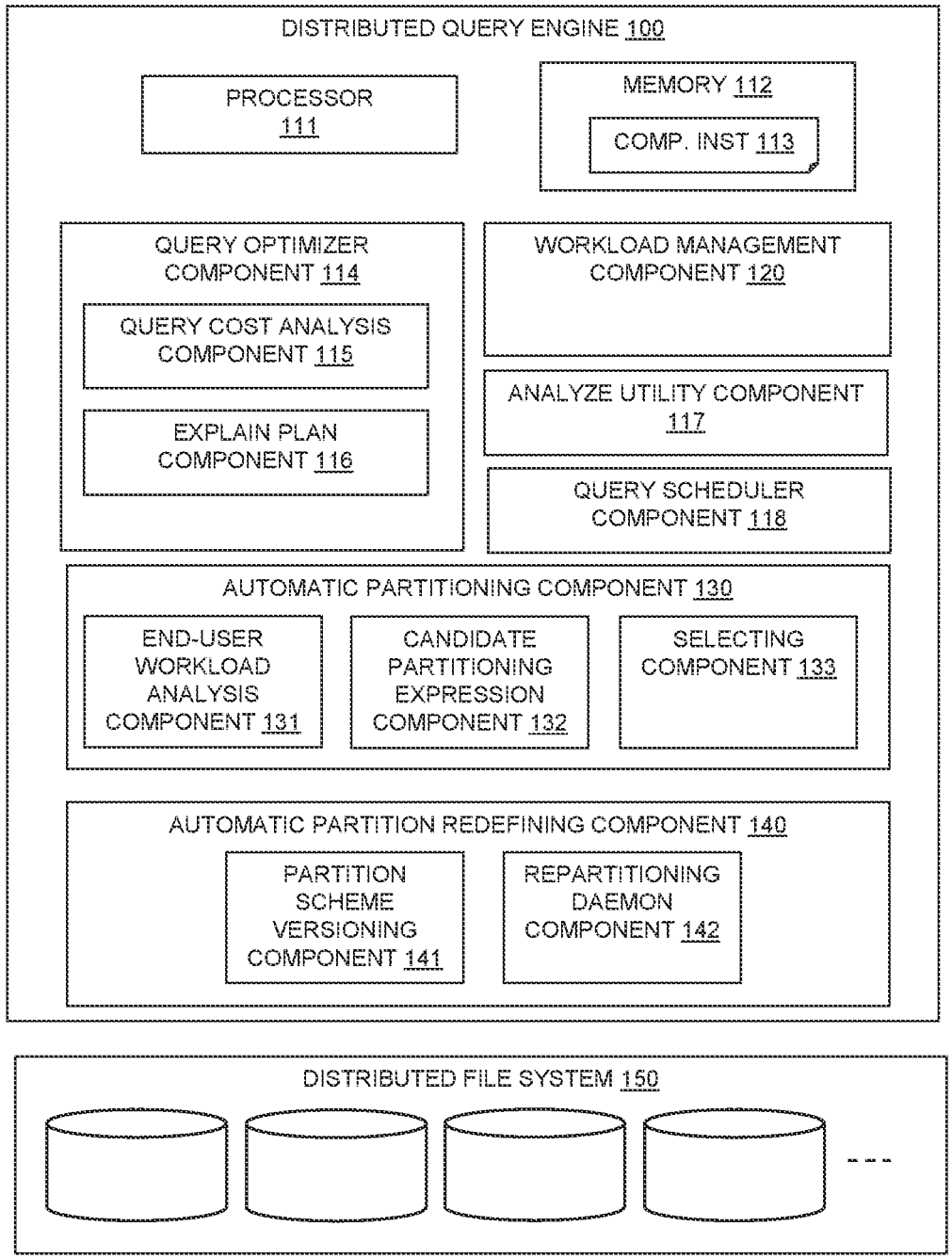
FIG. 1 is a schematic diagram of an example embodiment of a system in which the described technology may be implemented.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described approach provides automatic vertical partitioning of fact tables in a distributed query engine. The described approach also provides automatic redefining of the partitioning.

The described approach performs a holistic analysis over an end-user workload to identify the commonly featured local predicates and then transforms these into candidate partitioning expressions by utilizing the available optimizer distributions statistics, before iterating over these candidate expressions in order to choose the winning most optimal partitioning clause.

The described approach leverages a capability of distributed query engines, such as Structured Query Language (SQL)-on-Hadoop engines, in which an expression can be specified in a "partitioned by" clause when creating a fact table. One of the use cases of this partition on column expression feature is partitioning over a column with highly distinct values. Expressions using operators can be combined to group distinct values into fewer buckets. The term coarsification refers to a mathematical expression to reduce the cardinality (i.e., the number of distinct values) of a dimension. Partitioning by an expression over column(s) of a table provides the ability to coarsify the partitioning key of the table to reduce the cardinality or resulting number of partitions.

The described method analyzes an end-user workload of queries to extract filter predicates associated with each of multiple fact tables relating to a big data store. For a fact table, for each predicate where coarsification is required due to a cardinality of a predicate column, candidate partitioning expressions are generated and evaluated. The candidate partitioning expressions are generated by fitting a distribution model to the column distribution values and applying the distribution model in combination with a coarsification formula to achieve a target number of evenly spread partitions. A coarsification formula depends on the column data type and converts the data to reduce the number of distinct values. The candidate partitioning expressions are then scored based on cost data from the end-user workload to select the most optimal partitioning expression.

SQL-on-Hadoop engines are an important component of modern data lake implementations. These data lakes are enterprise-wide resources with petabytes of data residing in thousands of tables. The SQL query workload driven by hundreds of active users across these data lakes suggests various partitioning schemes. The challenge in practice is how to partition each table in a way that optimizes the opportunity for partition elimination across the entire workload, ensures that data is evenly distributed across the partitions, and that the number of partitions is not excessive.

The described approach automatically select an optimal partitioning scheme that addresses these challenges and partitions the tables according to this scheme. The described approach may also actively monitor the workload and ingest patterns and automatically adjust the partitioning scheme when the partitioning scheme is determined to be ineffective or inappropriate to the prevailing workload patterns.

Referring to FIG. 1, a block diagram shows an example embodiment of a distributed query engine 100 for enterprise-level big data workloads, such as an SQL-on-Hadoop query engine. The distributed query engine 100 references data in a distributed file system 150 (such as an Hadoop Distributed File System (HDFS) for an SQL-on-Hadoop query engine) based on end user queries.

The distributed query engine 100 may include at least one processor 111, a hardware module, or a circuit for executing the functions of the described components which may be software units executing on the at least one processor. Multiple processors running parallel processing threads may be provided enabling parallel processing of some or all of the functions of the components. Memory 112 may be configured to provide computer instructions 113 to the at least one processor 111 to carry out the functionality of the components.

The distributed query engine 100 may include a query optimizer component 114 that is responsible for choosing an optimal query access plan and may include a query cost analysis component 115 for providing an associated runtime cost estimate of a query. The cost is a notional unit of measure (referred to as a timeron), but in practice it represents a combination of the runtime duration and overall cluster resources needed to complete the query. In conjunction with the query optimizer component 114, the distributed query engine 100 may also feature a workload management (WLM) component 120 to monitor and control statements executing on the distributed file system 150. The distributed query engine 100 may also include a query scheduler component 118 in the form of a service that helps in the execution of queries and that communicates with other components in the distributed query engine 100.

There are two aspects to the described approach. A first aspect provides a method and system for automatic partitioning of tables provided by an automatic partitioning component 130. A second aspect automatically redefines the partitioning scheme over time in response to changes in the prevailing workload pattern or thresholds set on the number of partitions and is provided by an automatic partition redefining component 140.

The automatic partitioning component 130 may include an end-user workload analysis component 131 to perform an analysis over the end user workload and identify the set of local predicates associated with each fact table.

Modern SQL engines offer a workload manager (WLM) capability to collect the SQL queries issued by end users as well as various associated metrics including the query cost, execution time, relative priority of the query, etc. In an example embodiment, in conjunction with the WLM 120, the described system generates an access plan for each collected query using an engine's explain plan component 116 of the query optimizer component 114. The access plan includes a detailed dissection of the query and its associated metadata. In particular, the plan includes a structured list of the local predicates that feature in the query. The described end-user workload analysis component 131 harvests the full set of these local predicates across the workload and augments this dataset with the total estimated query cost, and priority for each predicate.

The automatic partitioning component 130 also includes a candidate partitioning expression component 132 for each local predicate identified by the end-user workload analysis component 131. The candidate partitioning expression component 132 examines the cardinality of each associated column and determines whether coarsification using partition-by-column-expression is needed to conform with a specified maximum number of partitions per table.

SQL-on-Hadoop engines have an analyze utility component 117 with capability to gather statistical metadata on a Hadoop table. As well as calculating the number of distinct values (the cardinality), this analyze utility component 117 calculates quantile histograms over the data distribution for each column in the table. The candidate partitioning expression component 132 leverages this statistical data to evaluate each local predicate column to determine whether coarsification is required. Additionally, the quantile histogram data will facilitate modelling or fitting of the distribution with a mathematical function to form the basis for a candidate coarsifying partitioning expression over the column in question in order to ensure an even distribution of data ingested in each partition.

The automatic partitioning component 130 also includes a selecting component 133 which scores the candidate coarsifying partitioning expressions by joining the datasets produced by the end-user workload analysis component 131 and the candidate partitioning expression component 132. Each candidate coarsifying partitioning expression is scored based on the overall cost. The proposed scoring algorithm is iterative, where single and compound partitioning clauses involving multiple columns and/or column expressions are evaluated to choose the most optimal partitioning clause on each table for the overall workload.

The automatic partition redefining component 140 may include two components: a partition scheme versioning component 141 and a repartitioning daemon component 142. The partition scheme versioning component 141 provides an ability to apply versioning to the partitioning clause. This will again leverage the partition by column expression feature.

The repartitioning daemon component 142 may be notified by the query scheduler component 118 if the query scheduler component 118 detects that a majority of partitions are not being matched by the partitioning expression/predicates injected during query compilation. In this case, the repartitioning daemon component 142 may consider redefining the partitioning of a latest partitioning clause in effect (i.e., the last clause of the list of partitioning clauses defined in the table data description language). This may take place during off-peak or quiet times.

Figure 2:
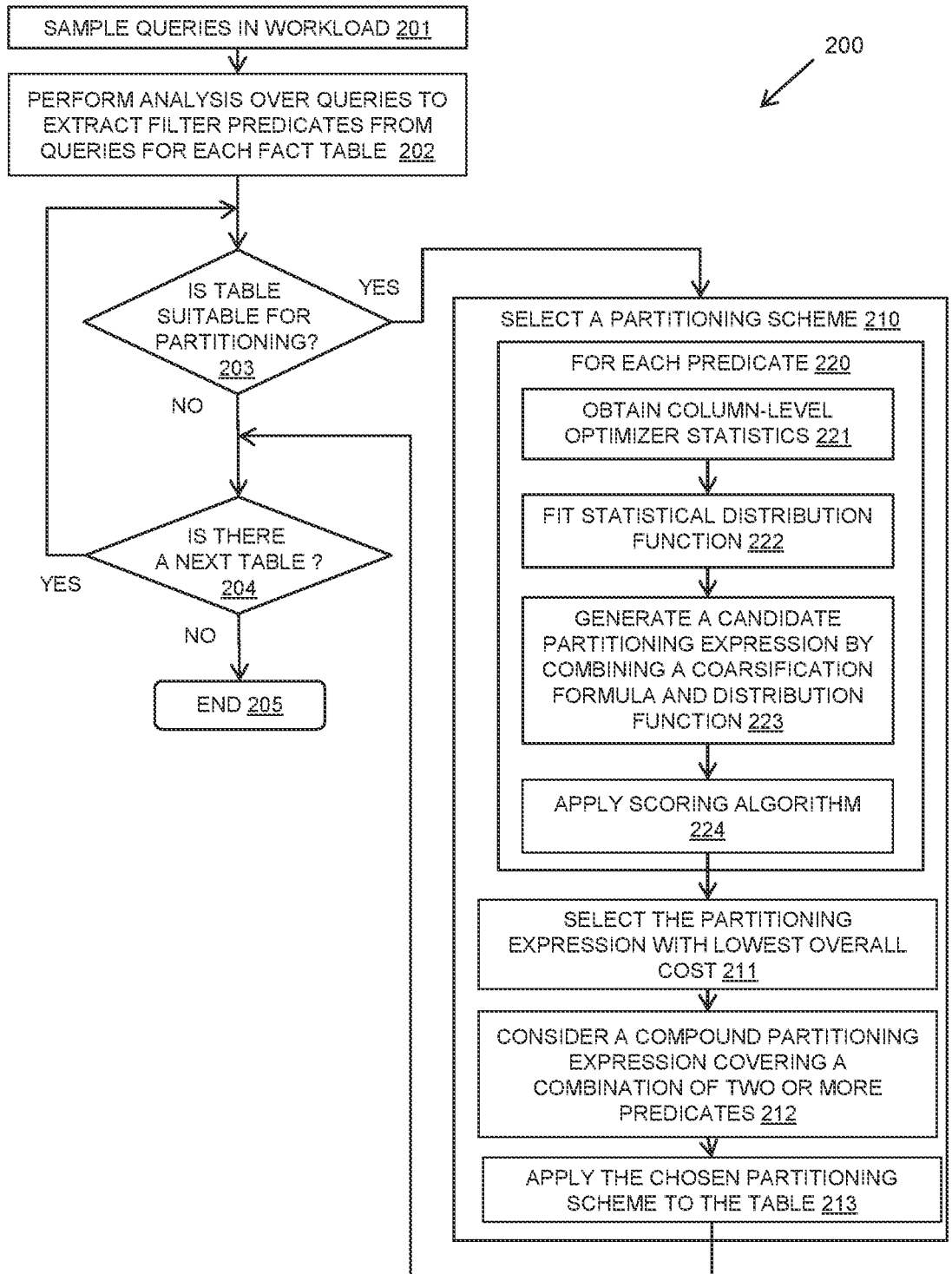
FIG. 2 is a flow diagram of an example embodiment of an aspect of a method in accordance with the described technology.

Referring to FIG. 2, a flow diagram 200 shows an example embodiment of the aspect of the described method of automatic vertical partitioning of fact tables in a distributed query engine.

Distributed query engine 100 may sample 201 queries in an end-user workload and may perform analysis 202 to extract filter predicates associated with each of multiple fact tables relating to a big data store. This may obtain local filter predicates from the explain plan of runtime queries, as collected using the inbuilt workload manager (WLM) component of an SQL engine.

Figure 3:
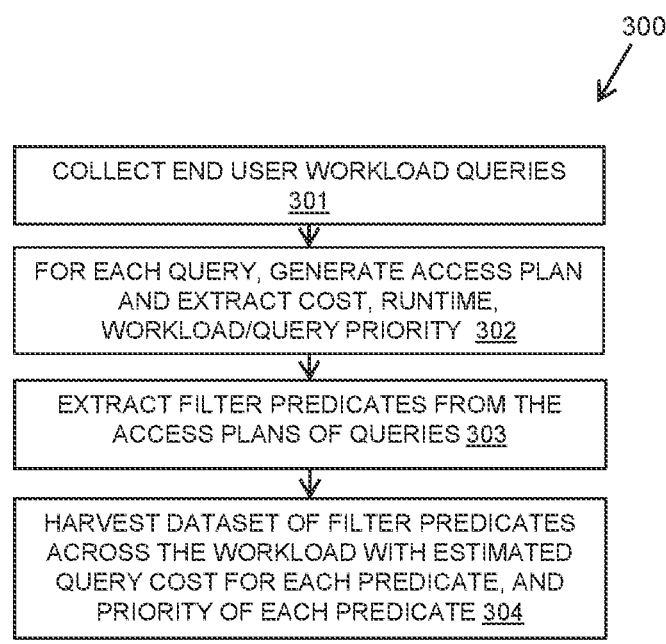
FIG. 3 is a flow diagram of an example embodiment of a first part of the aspect of the method of FIG. 2.

An example embodiment of this analysis is described in more detail with reference to the flow diagram 300 of FIG. 3. Distributed query engine 100 may collect 301 the queries issued by end users as well as various associated metrics including the query cost, execution time, relative priority of the query, etc.

Distributed query engine 100 may generate 302 an access plan for each collected query including a detailed dissection of the query and its associated metadata. In particular, including a structured list of the local predicates that feature in the query. Distributed query engine 100 may extract filter predicates 303 from the access plan of the queries.

Distributed query engine 100 may harvest 304 a dataset in the form of the full set of these local predicates across the workload and augment this dataset with the total estimated query cost, and priority for each predicate.

Referring again to the flow diagram 200 of FIG. 2, for each fact table, Distributed query engine 100 may determine 203 if the fact table is suitable for partitioning. If it is not, Distributed query engine 100 may loop to determine 204 if there is a next fact table. This may loop through all the fact tables until there are no more fact tables and the method may end 205.

For each fact table that is suitable for partitioning, distributed query engine 100 may select a partitioning scheme 210.

For each predicate 220 of the fact table, distributed query engine 10 may obtain 221 column-level optimizer statistics and may fit 222 a statistical distribution function to the column data.

Distributed query engine 100 may, where coarsification is required, generate 223 a candidate partitioning expression incorporating an adjustment to a coarsification function based on a data distribution of values in the column.

Distributed query engine 100 may score the candidate partitioning expression 224 based on cost data relating to the sample end-user workload.

The distributed query engine 100 may select 211 a partitioning expression with a lowest overall cost. The distributed query engine 100 may consider 212 a compound partitioning expression covering a combination of two or more predicates. The distributed query engine 100 may apply 213 the chosen partitioning scheme to the table.

Figure 4:
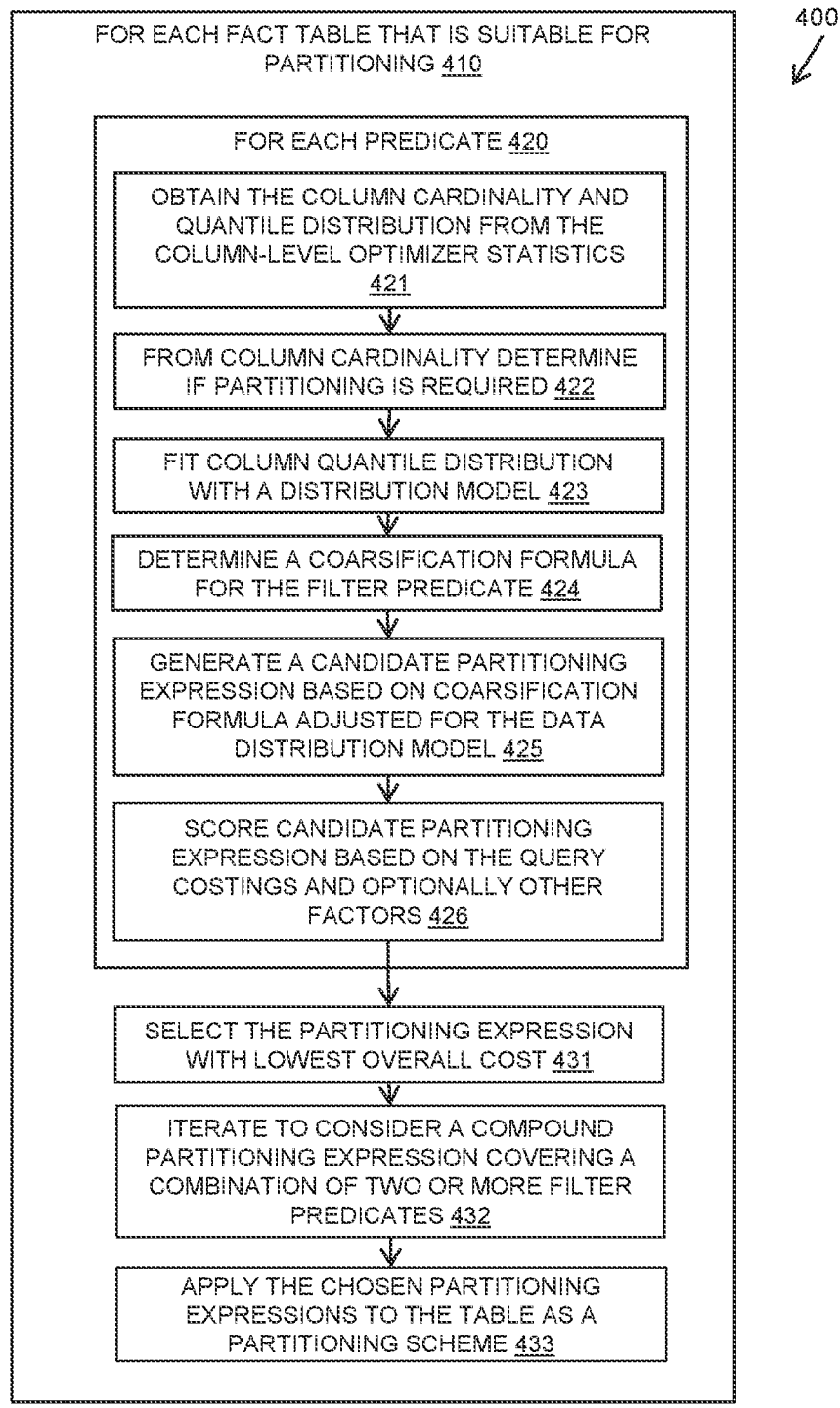
FIG. 4 is a flow diagram of an example embodiment of a second part of the aspect of the method of FIG. 2.

Referring to FIG. 4, a flow diagram 400 shows a more detailed example embodiment of the partitioning scheme selection 410 for each fact table that is suitable for partitioning. The approach may include configuring parameters of partitioning to be applied when generating a candidate partitioning expression, for example, the described approach may allow the user to set parameters governing the minimum size of a partition, the maximum number of partitions for date columns, and the maximum number of partitions for medium and large tables.

For each local predicate 420 identified in the end-user workload, the approach may obtain 421 the column cardinality and quantile distribution statistics from optimizer statistics.

The approach may examine the cardinality 422 (the number of distinct values) of each associated column and determine whether coarsification using partition-by-column-expression is needed, for example, to conform with a configured maximum number of partitions per table.

The approach may calculate quantile histograms over the data distribution for each column in the table and may fit 423 a column quantile distribution with a distribution model. Quantile histogram data may facilitate modelling or fitting of the distribution with a mathematical function or equation to form the basis for a coarsifying partitioning expression over the column in question in order to ensure an even distribution of data ingested in each partition.

As part of the fitting of the column value distribution, a goodness-of-fit measure, also known as the coefficient of determination, for the distribution model may also be calculated and used during the scoring step.

The approach may determine 424 a coarsification formula to reduce a number of distinct values for the filter predicate. The coarsification formula will depend on the data type of the column. The coarsification formula may include converting column data types to a numeric equivalent data type suitable for applying a partitioning expression.

The approach may generate 425 a candidate partitioning expression based on a coarsification formula adjusted for the data distribution model. The combination of the coarsification formula and distribution model aims to achieve a target number of evenly distributed partitions.

The approach may score 426 each candidate partitioning expression based on the query costings and, optionally, other factors. One of the other factors may be the goodness-of-fit measure of the data distribution model. Another factor may be a priority of a query as categorized by a workload manager. Another factor may be a proportion of queries that benefit from the candidate partitioning expression.

Cost data for queries may be obtained from the distributed query engine's query optimizer statistics consisting of one or more of: an input/output cost, a communications cost, and a processor cost. The weighting of the cost data may be configured based on a set of partition selection weighting parameters as provided and maintained by the administrator user.

The approach may select 431 the partitioning expression with lowest overall cost, representing the best overall combination of query performance across the workload, while respecting the limit parameters specified by the user and resulting number and size of partitions. Cost data may be obtained by applying the candidate partitioning expressions to each of the queries across the sample end-user workload, and calculating an overall cost for each query for each candidate partitioning expression.

The approach may include scoring compound partitioning expressions encompassing multiple columns in order to satisfy multiple filter predicates. Therefore, scoring the candidate partitioning expressions may be iterative 432 where single partitioning expressions and compound partitioning expressions involving multiple columns are evaluated to choose an optimal partitioning expression on each fact table for the overall workload.

The approach may apply 433 the chosen partitioning expression(s) to the table as a partitioning scheme.

Figure 6:
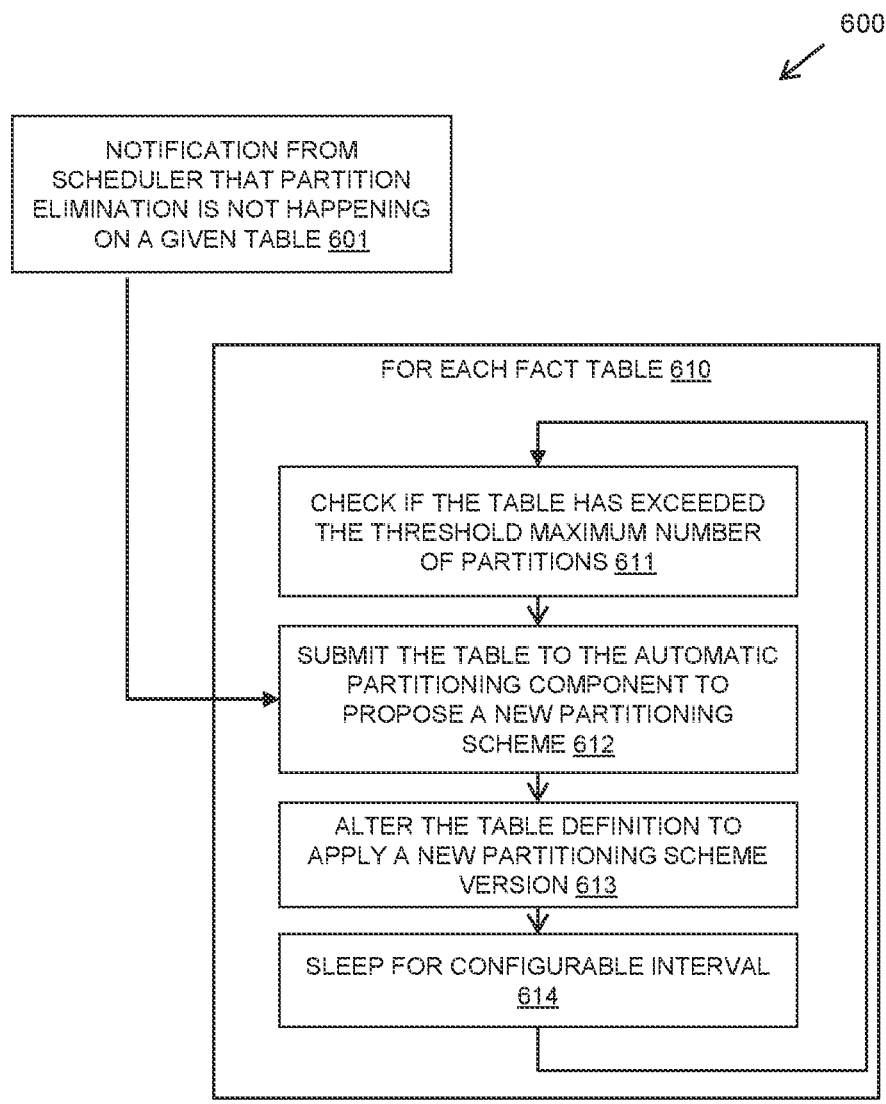
FIG. 6 is a flow diagram of an example embodiment of another aspect of a method in accordance with the described technology.

The approach may also include registering the table with the partitioning daemon to monitor and adjust the partitioning scheme as described in relation to FIG. 6.

The described methods are now described in more detail with examples used for explanation and illustration purposes.

The filtering of the data is done through predicates to limit the number of rows returned by a query. There can be local and join predicates. Local predicates are found after the WHERE clause of a query. There can be local equality and inequality predicates (=, !=), local range predicates (BETWEEN, <, >, <=,>=) and local comparison predicates. Comparison predicates can also include predicates with the IN, NOT IN, OR and LIKE operators. Local predicates can also include functions operations such as (SUBSTR, REGEXP_SUBSTR, CONCAT, DAY, INT, WEEK etc.) and expressions which could include multiple functions for example INT(SALES_DATE)/1000.

As a worked example, the partitioning directories for a LINEITEM table partitioned by (L_SHIPDATE DATE) are used. A separate directory for each unique L_SHIPDATE is created when the table is populated and the directory name will be tagged with the value. The data is stored in files within these directories. An example query includes a local predicate on the L_SHIPDATE column of the LINEITEM table. In this example the query includes the predicate "where l_shipdate>=date ('1998 Dec. 1')—3 day". This predicate is based on a simple expression to retrieve/filter the data for all shipments that occurred within the three days prior to 1998 Dec. 1. Queries with predicates on the partitioning column will only read those files that qualify.

There is a capability in distributed query engines, such as SQL-on-Hadoop engines, in which an expression can be specified in a "partitioned by" clause when creating a fact table. One of the use cases of this partition on column expression feature is partitioning over a column with highly distinct values. Expressions, such as using CAST, HASH and division (DIV) operators, can be combined to group distinct values into fewer buckets. Partitioning by an expression over a column(s) of a table provides the ability to coarsify the partitioning key of the table to reduce the cardinality or resulting number of partitions.

In this way, partitioning by an expression can provide the ability to partition a table to optimize queries that feature filter predicates while also keeping the resulting number of partitions to a manageable level.

The following simple example is used to show coarsification partitioning. An order table may use standard partitioning and be "PARTITIONED BY (purchase_date date)". Partitioning by a column expression would be "PARTI- TIONED BY (YEAR(purchase_date) AS purchase_year). In an equivalent Hive table, "hive. describe table bigsql.orders_part_year", partition information would be "col_name data_type; purchase_year int".

An original query may be:

```
SELECT COUNT (order_no)
FROM ORDERS_PART_YEAR
WHERE purchase_date between '2015-01-01' and '2016-12-31'.
```

This query would be automatically rewritten to inject a local predicate to take advantage of the coarsified partitioning key:

```
SELECT COUNT (order_no)
FROM ORDERS_PART_YEAR
WHERE purchase_date between '2015-01-01' and '2016-12-31'
AND purchase_year between 2015 and 2016.
```

As part of the query rewrite phase of SQL compilation, predicates on partitioning columns are automatically generated if there are predicates on the column that the partitioning column is derived from for these operators:

Logical operators: AND, OR, IN, NOT IN, NOT;
Comparison operators: (equal-to, less-than, greater-than; and their negations).

This means that there is no need to manually add predicates to existing queries in order to observe performance benefits when using this feature. Notice that in the original query there are predicates on the purchase_date column. Since the purchase_year column is derived from the purchase_date column, the query will be automatically rewritten and predicates on the purchase_year column will be automatically generated.

The partitioning column is populated during ingestion by deriving the value using the column expression, for example, as part of an INSERT INTO <table> SELECT operation.

A coarsification formula for partitioning a column includes conversion to a suitable value for a partitioning expression. The coarsification formula converts the datatype of a candidate partitioning column, where required, to a suitable datatype for a partitioning expression.

There are some constraints around the choice of partitioning expressions. There are cases when it is not possible to generate a new predicate based on the partitioning expression. In particular, local predicates can be automatically generated only for a partitioning column derived from the expression when deterministic and monotonic functions are used in the expression. A non-deterministic function is one such that the result of the function maybe different each time e.g. RAND is a non-deterministic scalar function. In this case, the SQL-on-Hadoop engine will not generate an additional predicate. A monotonic function is one that as the input to the function increases or decreases, the result of the function increases/decreases. YEAR and INT are examples of monotonic functions, but MONTH and DAY are non-monotonic functions. For non-monotonic functions, it is mathematically not possible to generate greater than or less than predicates which limits their usefulness for range scans e.g. BETWEEN clause.

Thus, when trying to partition date based columns on the month or day, instead of using non-monotonic functions such as MONTH and DAY, the described approach uses alternate functions that represent the same information. An integer representing the year, month and day can be used instead. So for example, it is possible to combine the INT (integer), CAST and DIV (division) functions like INT(cast (dispatch_date as date)/100) instead of the MONTH function i.e. MONTH(dispatch_date). Automatic generation of between predicates can be observed when these monotonic functions are used.

Partitioning expressions over columns storing numeric values are straightforward, where a simple divisor can be applied to monotonically achieve the desired number of partitions.

For a partitioning expression column storing character or string values, it is possible to apply a combination of the SUBSTRING and ASCII functions to represent the string as a numeric to which a monotonic divisor can applied. If alphanumeric values are assumed in the column, there would therefore be 26+10=36 distinct values in each character position. The string can be converted to a numeric equivalent by applying the ascii conversion to the n leftmost characters of the string. For example, by considering the first 2 characters of the string value, the expression would be like: ascii(substr(colvalue,1,1))*100+ascii(substr (colvalue,2,1)).

Regardless of the datatype of the candidate partitioning column, an important consideration is the distribution of the values. If the data in the candidate partitioning column is uniformly distributed across the range of values, a simple constant divisor can be used to coarsify the key. However, if the data is not uniformly distributed then it is important to reflect this in the partitioning expression so that the partitioning does not result in a skewed distribution where most of the data resides in relatively few partitions with many other partitions being effectively empty, which can have a profoundly negative impact on performance.

The described approach leverages the SQL engine's query optimizer statistics in order to adjust the partitioning expression to account for the data distribution. Modern SQL engines incorporate a cost-based optimizer which relies on detailed statistical metadata gathered by an analyzer component. This metadata typically includes histograms of the distribution of data across each column in the table. In particular, these histograms are often represented as quantiles.

Quantile statistics provide information about how data values are distributed in relation to other values. Called K-quantiles, these statistics represent the value V at or less than which at least K values lie. The number of sections (quantiles) into which the column data values should be grouped, is configurable but typically in the range of 20 to 100. For example, 20 quantiles would ensure a maximum optimizer estimation error of plus or minus 2.5% for any equality, less-than, or greater-than predicate, and a maximum error of plus or minus 5% for any BETWEEN predicates. With larger datasets a larger value, typically in the order of 100 quantiles, is selected as the estimation error becomes more significant at scale.

Although a partitioning expression could be constructed using a formula directly over the quantiles, this would become rather verbose and unwieldy particularly when the number of quantiles configured is towards the higher range. Therefore, the described approach fits the quantiles with a representative mathematical model in order to obtain a more succinct formula or equation that can be then utilized in the partitioning expression in a practical way.

In essence, the X-axis would then represent the column value and the Y-axis the quantiles, having a value of between 0 and 1, where 0 and 1 represents the minimum and maximum quantile, respectively. For example, if the distribution statistics are configured with 100 quantiles, then there will be 100 data points with a distance of 0.01 between the points on the Y-axis. The describe method then applies a set of well-known models to the plot of the quantiles, such as linear regression, ordinary least squares (OLS), and so on, and chooses a model which reflects the best fit.

Figure 5A:
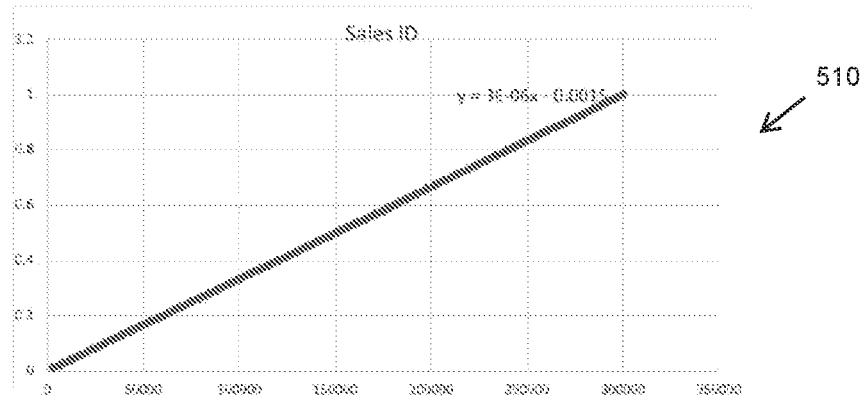
FIGS. 5A, 5B and 5C are example graphs illustrating data distributions of column values.

For example, FIG. 5A shows the distribution 510 of an integer sales identification (ID) column, and the linear equation that fits the dataset. If the desired target number of partitions for this sales ID column is 5000, then the required partitioning expression is ((3E−06x−0.0015)*5000).

Figure 5B:
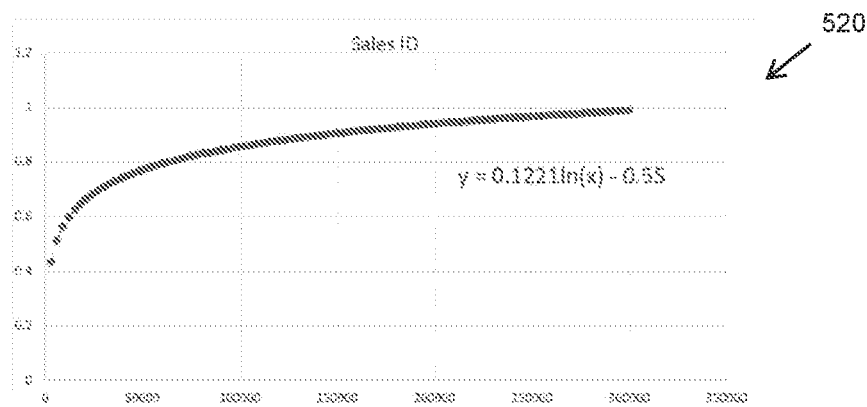

In another example, FIG. 5B shows the distribution 520 of the integer sales ID column, where a logarithmic equation is the best fit for the dataset. If the target number of partitions for this this sales ID column is 5000, then the partitioning expression is (0.1221* ln(x)−0.55)*5000).

Figure 5C:
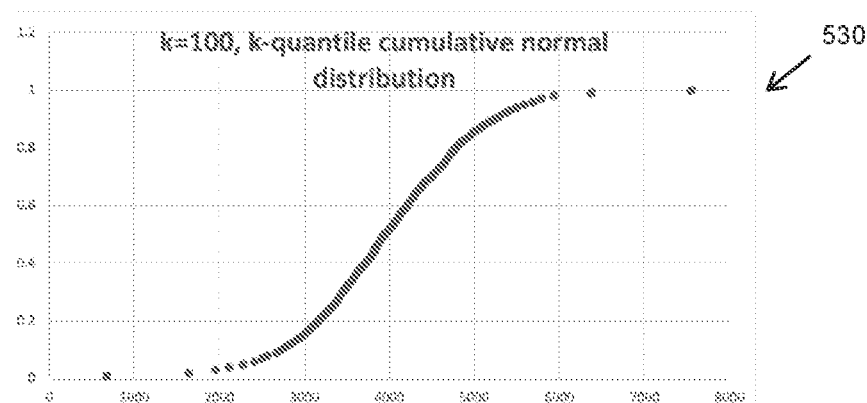

In naturally occurring datasets, for example, the data often follows the pattern of a normal distribution. In this case, a plot of the cumulative quantile data over an integer column might look like the distribution 530 of FIG. 5C. If the data is normally distributed then an inbuilt function may be written to fit the distribution. This function would satisfy the requirement that the function be deterministic and monotonic.

As discussed, columns with other data types can be converted to a numeric equivalent. For example, dates can be converted to a numeric distribution using an expression such as INT(cast(dispatch date as date)) which would result in up to 365 days for each year spanned by the column. Strings can be handled by a combination of SUBSTRING and ASCII functions to represent the distribution as a continuous numeric range. The quantiles can be represented as a continuous distribution by applying the ASCII conversion to the n left-most characters of the string.

For example, by considering the first three characters of the string value, the formula of ascii(substr(colvalue,1,1))*10000+ascii(substr(colvalue,2,1))*100+ascii(substr(colvalue,3,1), would result in a distribution of approximately 36×36×36 or 46656 possible values. This resulting distribution can then be fit with a suitable model to achieve a candidate partitioning expression that results in a desired number of evenly distributed partitions, in the same way as described above for a numeric distribution.

The desired number of partitions may differ depending on the existing or projected size of the table. The number of partitions may be selected so that there is at least a single HDFS block, typically 128 MB in size, per compute or worker node. This is because each worker can process at least one block in parallel. Thus, on a cluster with 10 workers, a table with 1000 evenly-sized partitions should be at least 10*1000*128 MB=1.25 Terabytes in size. Furthermore, candidate partitioning columns involving a date or timestamp column or another column whose range of values increases over time on a temporal basis deserve additional consideration. For such tables, the target number of partitions should reflect the anticipated range of values in the column. The described approach allows the user to set parameters governing the minimum size of a partition, the maximum number of partitions for date columns, and the maximum number of partitions for medium and large tables. These parameters may be defaulted to 128 MB×no of workers, 5000 and 10,000 respectively, but may be customizable by the administrator.

As part of the fitting of the column value distribution, a goodness-of-fit measure, also known as the coefficient of determination (e.g. r-squared), for the model may also be calculated. This value between 0 and 1 indicates how well the chosen model represents the data. The closer the value is to 1 the better the fit and vice versa. The goodness-of-fit measure may be incorporated in the approach for selecting the optimal partitioning expression in order to favor candidate partitioning expressions that are a good fit to the data distribution. Similarly, the complexity of the partitioning expression will influence the selection of the optimal expression from the possible candidates, with relatively simpler expressions being favored as they are computationally less expensive. The complexity of the partitioning expression is accounted for by leveraging the cost-based optimizer.

Accordingly, the described approach provides a method to select individual or compound partitioning expression clauses to encompass multiple columns in order to satisfy potentially more than a single filter predicate, while also keeping the resulting the number of partitions to a manageable number. A manageable number may be typically less than 10 thousand partitions per table depending on the volume of data involved and the associated splits.

The cost-based query optimizer has the ability to provide an accurate cost estimate for an optimal access plan for a given query based on the available optimizer statistics, the cluster hardware resources, the network topology, the query itself and the partitioning predicates therein. This cost estimate may be comprised of three constituent measures: an estimated IO cost, representing the cost of reading the data from the filesystem; an estimated communications cost, representing the cost of the network communication between the nodes in the cluster; and an estimated CPU cost representing the cumulative CPU cycle required to process the query. This capability may be provided by an existing EXPLAIN PLAN component.

The described method proposes that for each candidate partitioning expression that the associated queries collected by the workload manager for a given table are submitted to EXPLAIN PLAN in order to obtain a cost estimate for each query for each candidate expression. The cost estimate will account for the relative complexity of the candidate expression. The cost estimate may then be used in conjunction with some other criteria such as the priority of the query as categorized by the workload manager, and the proportion of queries that would benefit from this partitioning scheme, in order to score each partitioning expression. The scoring may also be influenced by a set of weightings specified by the administrator as to which of IO, Comm or CPU are the most important resources to optimize when choosing the optimal candidate partitioning expression.

The candidate partitioning expressions are applied to each of the queries across the workload sampled by the workload manager, and an overall cost is calculated for each query for each candidate partitioning expression. The resulting cost is then aggregated for each candidate expression and the expression with the lowest aggregate cost is then selected as the winning most optimal partitioning expression for the table.

An example costing score may be calculated as a total cost for candidate expression n=Σ(((X+C*1.2+D*1.3)*Q*W)/CoD) Where: X=CPU Cost, D=I/O Cost, C=Communication Cost, Q=Number of instances/occurrences of this particular query, W=Workload priority (value between 1 and 5, with 1 being the highest priority), CoD=Coefficient of Determination (measure of fitness of the distribution model–value between 0 and 1). In this example, the weights defaulted for IO Cost and Communication Cost are specified as 1.3 and 1.2, respectively; however, these weights may be customizable by the administrator.

The partitioning expression with the lowest overall cost across the workload is selected as the winner. If expressions on two or more columns can be used together in combination, then the cost is calculated based on the two or more expressions being applied to the table, so that queries can benefit from the two or more expressions. Thus, a second and subsequent pass of the data may be made for the top identified partitioning expressions, especially if one of the candidate columns is a low cardinality column, to determine if a mutual combination of these two partitioning expressions would be even more beneficial.

By way of illustration, attached Tables 1A, 1B, and 1C provide a simple worked example of how this scoring formula is used in practice.

TABLE 1A

| Query No. | Column Name | Data Type | Column Cardinality | Filter Predicate | No. of instances of query |
|---|---|---|---|---|---|
| 1 | Order_no | Int | 4223504073 | order_no = ? | 1275 |
| 2 | Cust_name | varchar(50) | 4143543521 | cust_name = ? | 999 |
| 3 | Address | Varchar(155) | 3934534121 | address LIKE ?% | 579 |
| 4 | Purchase_date | date | 90121 | purchase_date between ? AND ? | 191 |
| 5 | Dispatch_date | timestamp | 534563562 | dispatch_date between ? AND ? | 332 |
| 6 | Region_id | char(2) | 2 | region_id = ? | 999 |

TABLE 1B

| Coarsification/ Type Conversion | Distribution Model | CoD |
|---|---|---|
| — | y = 3E−11x − 0.0341564 | 0.97 |
| ascii(substr(cust_name, 2, 1))*100 + ascii(substr(cust_name, 3, 1) | y = 0.000033x − 0.021 | 0.95 |
| ascii*substr(address, 1, 1))*10000 + ascii*substr(address, 2, 1))*100 + ascii*substr(address, 3, 1)) | y = (0.1221*In(x) − 0.55) | 0.96 |
| int(purchase_date) | NORMALDIST | 0.94 |
| int(date(dispatch_date)) | y = 0.0033x − 0.212 | 0.98 |
| — | — | — |

As shown above, CoD is the coefficient of determination which is a measure of fitness to the distribution model.

TABLE 1C

| X | D | W | C | P* |
|---|---|---|---|---|
| 43534 | 60948 | 2 | 57592 | 5000 |
| 66577 | 90904 | 1 | 85243 | 1000 |
| 354451 | 75140 | 2 | 70692 | 5000 |
| 132431 | 176514 | 3 | 164268 | 5000 |
| 43233 | 60557 | 4 | 57231 | 3000 |
| 66577 | 90904 | 1 | 85243 | 2 |

As shown above, X is the CPU cost, D is the I/O cost, W is the workload priority, C is the communication cost, and P* is the maximum number of partitions.

Next, we aggregate the cost calculated from the scoring in Table 1A, 1B and 1C, totaling the weighted costs with the workload and coefficient-of-determination applied.

The candidate expressions are ranked by total lowest-cost. The top ranked lowest-cost candidate expression over the workload is the candidate partition expression for the Customer Name.

The candidate expression is a combination of the type-conversion and the distribution model, as follows:

Round((ascii(substr(cust_name,2,1))*100+ascii(substr(cust_name,3,1))*0.000033−0.021)*1000,0)

An example of a generated local predicate automatically injected by the optimizer in order to exploit the partitioning expression is shown below.

For an example predicate of cust_name LIKE 'JO %', the following is injected as a local predicate:

partcol=Round((ASCII('J')*100+ASCII(; O'))*0.0033−0.021)*1000,0) i.e., partcol=Round (((74*100+79)*0.00033−0.021)*1000,0) i.e., partcol=226

The next ranked lowest-cost candidate expression over the workload is the Region ID for which no injection is required.

As the target number of partitions for the top ranked expression is just 1000, we can also incorporate an additional column, region_id, in the partitioning clause, and still be within the configured maximum number of partitions. Thus, the selected winning partitioning expression for the orders table is:

PARTITION BY (region_id, Round ((ascii(substr(cust_name,2,1))*100+ascii(substr(cust_name,3,1))* 0.000033−0.021)*1000,0) as partcol).

For automatic redefining of partitioning, the partitioning scheme may need to be adjusted over time based on the prevailing query patterns or the number of partitions being created during data ingestion.

For example, in the fact table ORDERS which has two dimensions REGION_ID and PRODUCT_ID. When a partitioning scheme was originally chosen, the most common local predicate at that time was on REGION_ID. Over time, the reporting requirements change and the most commonly used predicate may be based on PRODUCT_ID. Eventually, it may be observed that the original partitioning scheme is benefiting a very small proportion of the overall workload across the ORDERS table. The partitioning scheme may then be adjusted to reflect the prevailing query pattern and this adjustment may happen automatically and be transparent to the end users.

In another scenario, it may be observed that the total number of partitions in the given table has exceeded a threshold. This threshold may be a system-wide value configured by the administrator to set a soft maximum on the number of partitions. When this soft maximum threshold is exceeded, the partitioning scheme may be adjusted to increase the coarsification applied to the partitioning column(s) in order to reduce the rate at which partitions are created henceforth.

To this end, the described approach may apply versioning to the partitioning clause. This will again leverage the partition by column expression feature. Instead of naming the partitioning column based on a logical derivation of the underpinning column in the expression (e.g. delivery_month for an expression MONTH(delivery_date)), the partitioning column may be given a fixed meaning-less name, e.g., partcol. Additionally, the values of the partitions may be prefixed with a version label for each version of the partition clause. For example, an initial partitioning expression might be daily based on DATE(delivery_date), and later this is required to be further coarsified to MONTH(delivery_date). In this case, the initial partitioning clause would be PARTITIONED BY DATE(delivery_date) as P1, while the subsequent updated partitioning clause would be PARTITIONED MONTH(delivery_date) as P2. The resulting partition names, and the associated directories on a HDFS, would be P1: <date>(e.g. P1:20180216) and P2: <month> (e.g. P2:202005). The optimizer may consider both versions of the partitioning scheme and transparently rewrite the query to inject the appropriate generated local predicates.

As discussed briefly in the previous section, there are two scenarios which would benefit from dynamic re-partitioning.

In a first scenario, the approach may automatically and dynamically adjust partitioning strategy based on a current prevailing query pattern. This may be activated by notification from the query scheduler component that partition elimination is not happening on a given table.

For example, the prevailing query pattern from the end users may change from being based on filtering on dispatch_date to filtering on delivery_date at a given time. The proposed automated re-partitioning daemon may detect this change in query patterns (based on WLM monitoring input) and then automatically adjust the partitioning scheme key accordingly from dispatch_date to delivery_date. This new partitioning key would then be used for any subsequent ingestion to the table.

In a second scenario, the approach may automatically and dynamically adjust partitioning strategy based on thresholds configured on the number of partitions For example, a threshold may have been configured for the number of partitions in a table as a dispatch_time, with a value of 5000. Once this threshold has been breached the repartitioning daemon is activated and determines a coarser grain of partitioning (in order to prevent too many partitions), in this case dispatch_date instead of dispatch_time. The partitioning clause is then altered to use this new partitioning scheme. The repartitioning daemon then adjusts the threshold for the table by 10% to 5500. Later, when the number of partitions in the table exceeds 5500 the repartitioning daemon then interjects again and coarsifies the partitioning scheme further, this time from dispatch_date to dispatch_month.

Referring to FIG. 6, a flow diagram 600 shows an example embodiment of the aspect of the described method of partition redefining as carried out by the automatic partition redefining component 140.

For each fact table 610, the automatic partition redefining component 140 may carry out a check 611 to check if the table has exceeded a configured threshold of maximum number of partitions. If so, the automatic partition redefining component 140 may submit the table 612 to the automatic partitioning component 130 to propose a new partitioning scheme.

The automatic partition redefining component 140 may also receive 601 notification from a scheduler that partition elimination is not happening on a given table. If the automatic partition redefining component 140 receives such a notification, the automatic partition redefining component 140 may also submit the table 612 to the automatic partitioning component 130 to propose a new partitioning scheme.

Once a new partitioning scheme is obtained, the automatic partition redefining component 140 alters the table definition 613 to apply the new partitioning scheme version. The partition redefining component 140 may then sleep 614 for a configurable interval before looping to check 611 again if the table has exceeded the configured threshold maximum number of partitions.

In addition, the repartitioning daemon component 142 may check the number of partitions in each table and determine whether the number of partitions has breached the soft limit configured by the administrator to control the maximum number of partitions allowed in any given table. Again, if the repartitioning daemon component 142 determines that the threshold has been breached then the daemon will invoke the automatic partitioning component 130 to evaluate and apply a new version of the partition clause to the table.

The repartition daemon component 142 may perform its transforming/re-partitioning older partitions during off-peak or other quiet times.

Figure 7:
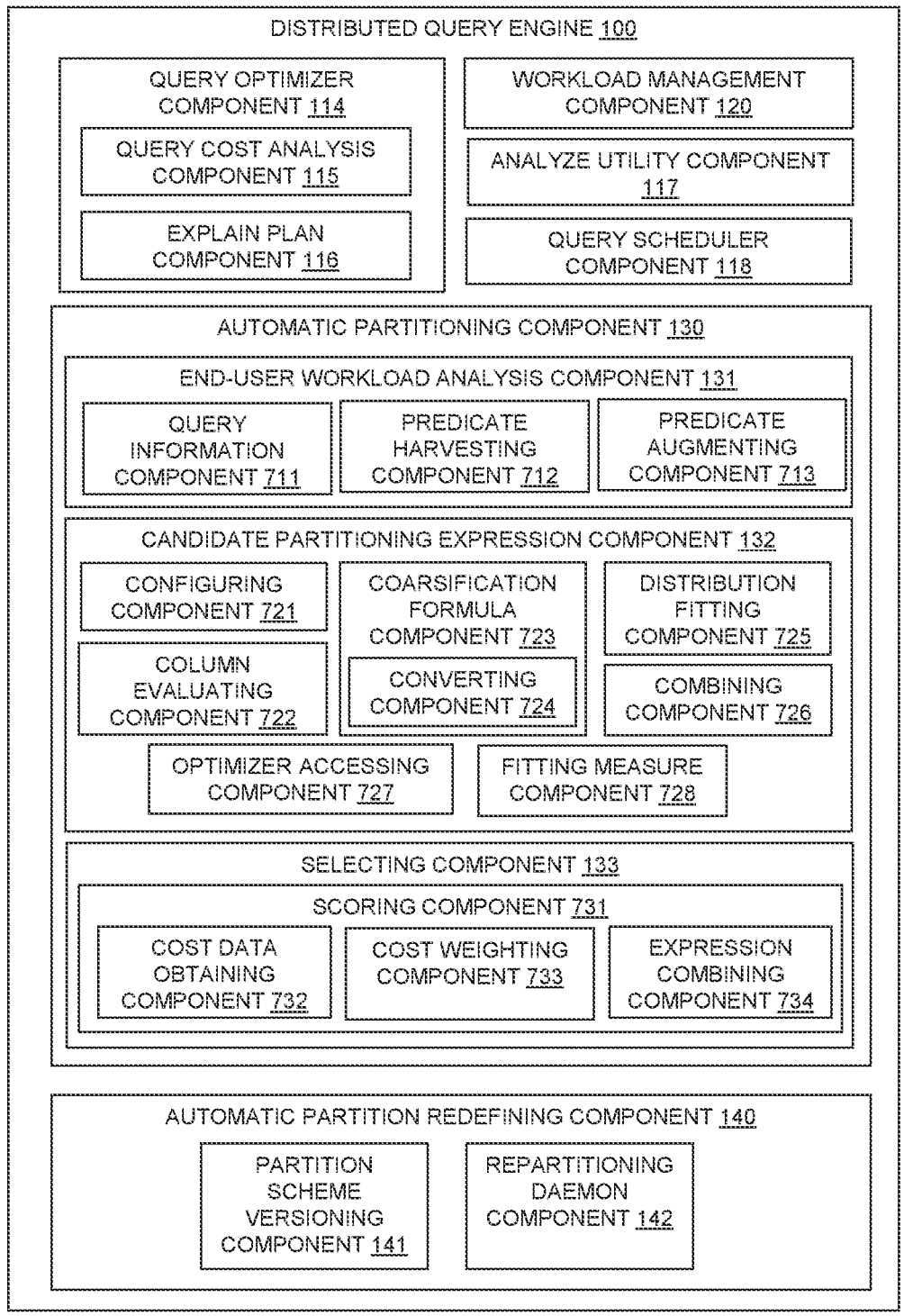
FIG. 7 is block diagram of an example embodiment of a system in accordance with the described technology.

Referring to FIG. 7, a block diagram shows an example embodiment of the distributed query engine 100 of FIG. 1 incorporating the described system with further components shown.

As described in FIG. 1, the automatic partitioning component 130 may include: an end-user workload analysis component 131 for analyzing a sample end-user workload of queries to extract filter predicates; a candidate partitioning expression component 132 for, for each fact table and for each appropriate column in the fact table generating a candidate partitioning expression; and a selecting component 133 including a scoring component 731 for scoring the candidate partitioning expressions for each fact table based on cost data relating to the sample end-user workload, and selecting one or more candidate partitioning expressions to optimize partitioning of each fact table with each partition data being placed in a separate directory in a distributed file system.

The end-user workload analysis component 131 may include: a query information component 711 for obtaining a detailed dissection of queries and their metadata including a structured list of filter predicates that feature in a query; a predicate harvesting component 712 for harvesting a full set of filter predicates across the workload; and a predicate augmenting component 713 for augmenting each filter predicate with an estimated query cost and a priority.

The candidate partitioning expression component 132 may include a configuring component 721 for configuring parameters of partitioning with the parameters applied when generating a candidate partitioning expression. The candidate partitioning expression component 132 may include a column evaluating component 722 for determining if coarsification is required for each column in the fact table by examining a cardinality of the column to conform with a configured maximum number of partitions per fact table.

The candidate partitioning expression component 132 may include: a coarsification formula component 723 for determining a coarsification formula to reduce a number of distinct values for the filter predicate; a distribution fitting component 725 for fitting a distribution model to data values of the sample in the column; and a combining component 726 for generating a candidate partitioning expression in the form of a combination of the coarsification formula and an equation of the distribution model.

The coarsification formula component 723 may include a converting component 724 for converting column data types to a numeric equivalent data type suitable for applying a partitioning expression.

The candidate partitioning expression component 132 may include an optimizer accessing component 727 for accessing the distributed query engine's query optimizer statistics to obtain a distribution of data across each column in the table. The distribution fitting component 725 may include fitting quantile statistical data with a representative mathematical model in order to obtain an equation that can be incorporated in the candidate partitioning expression. The distribution fitting component 725 may also include a fitting measure component 728 for calculating a goodness-of-fit measure and incorporating the goodness-of-fit measure in the scoring of candidate partitioning expressions.

The scoring component 731 may include a cost data obtaining component 732 for obtaining cost data for queries from the distributed query engine's query optimizer statistics consisting of one or more of the group of: an input/output cost, a communications cost, and a processor cost; and a cost weighting component 733 for configuring weightings of cost data for scoring the candidate partitioning expressions.

The scoring component 731 may score the candidate partitioning expressions based on cost data in combination with a priority of a query as categorized by a workload manager, and a proportion of queries that benefit from the candidate partitioning expression.

The scoring component 731 may include an expression combining component 734 and may score compound partitioning expressions encompassing multiple columns in order to satisfy multiple filter predicates and may be iterative where single partitioning expressions and compound partitioning expressions involving multiple columns are evaluated to choose an optimal partitioning expression on each fact table for the overall workload.

The automatic partition redefining component 140 may include a partition scheme versioning component 141 to provide a fixed name for a partition and to provide a version label for each version of the partition clause.

The automatic partition redefining component 140 may include a repartitioning daemon component 142 that may be notified by the query scheduler component 118 if the query scheduler component 118 detects that a majority of partitions are not being matched by the partitioning expression/predicates injected during query compilation.

The query scheduler component 118 provides access to the metadata for fact tables that are involved in a scan. This metadata includes table descriptors with details such as column types, column lengths, partition information, and input format. It evenly distributes the scan of a table across the cluster. It is the query scheduler component that carries out the partition elimination, before assigning splits to IO component. The query engine IO component (readers and writers) uses the information from the query scheduler component 118 to do the actual reading and writing of distributed file system data.

The described system proposes to enhance the query scheduler component 118 to notify the repartitioning daemon component 142 if it detects that a majority of (older) partitions are not being matched by the partitioning expression/predicates injected during query compilation for a given table. In this event, the repartitioning daemon component 142 may consider adjusting the partitioning scheme. To this end, the repartitioning daemon component 142 may invoke the automatic partitioning component 130 to evaluate and apply a new partition clause version to the table.

Figure 8:
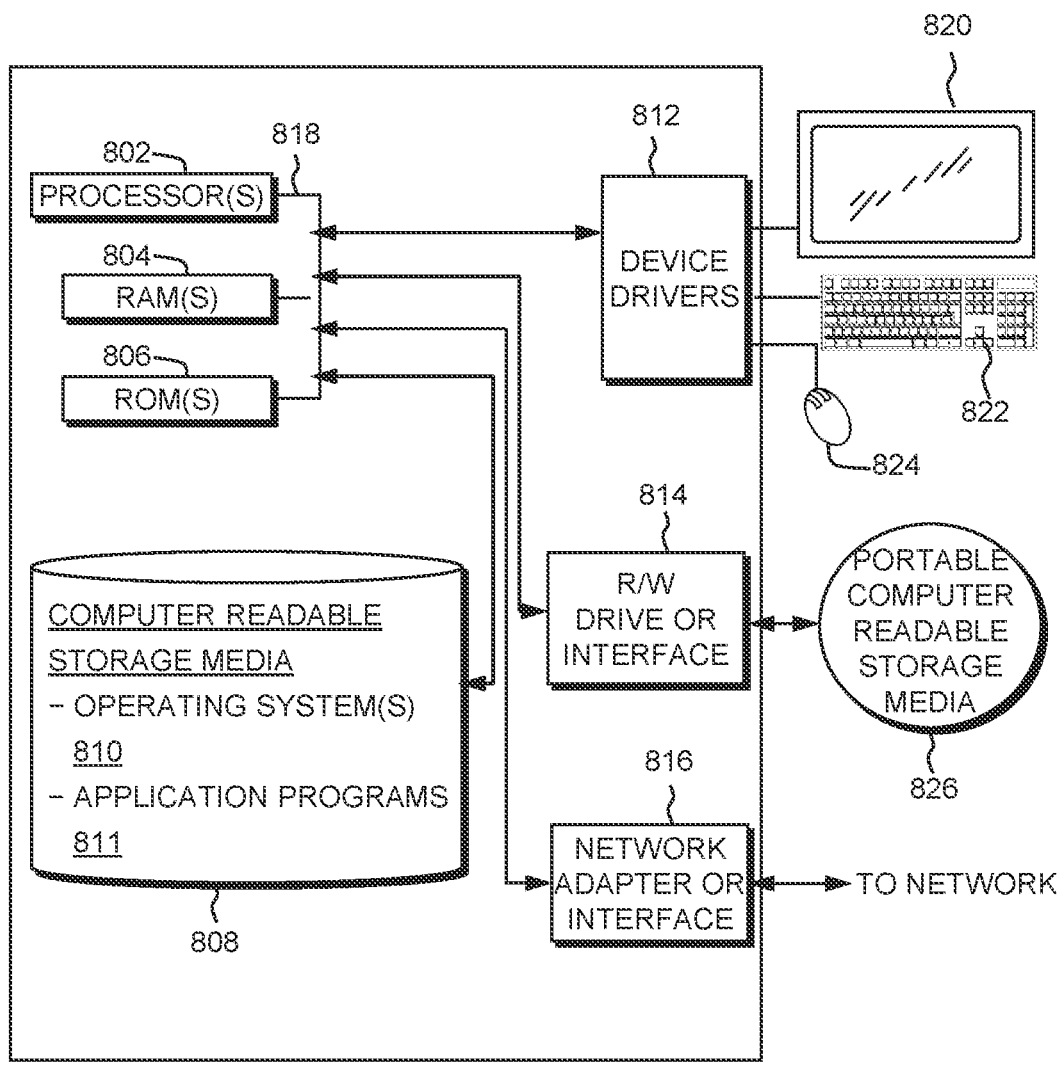
FIG. 8 is a block diagram of an embodiment of a computer system or cloud server in which the described technology may be implemented.

FIG. 8 depicts a block diagram of components of the computing device of a distributed query engine 100 of FIG. 1 and FIG. 7, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Computing device can include one or more processors 802, one or more computer-readable RAMs 804, one or more computer-readable ROMs 806, one or more computer readable storage media 808, device drivers 812, read/write drive or interface 814, and network adapter or interface 816, all interconnected over a communications fabric 818. Communications fabric 818 can be implemented with any architecture designed for passing data and/or control information between processors (such as microprocessors, communications and network processors, etc.), system memory, peripheral devices, and any other hardware components within the system.

One or more operating systems 810, and application programs 811, are stored on one or more of the computer readable storage media 808 for execution by one or more of the processors 802 via one or more of the respective RAMs 804 (which typically include cache memory). In the illustrated embodiment, each of the computer readable storage media 808 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include a R/W drive or interface 814 to read from and write to one or more portable computer readable storage media 826. Application programs 811 on computing device can be stored on one or more of the portable computer readable storage media 826, read via the respective R/W drive or interface 814 and loaded into the respective computer readable storage media 808.

Computing device can also include a network adapter or interface 816, such as a TCP/IP adapter card or wireless communication adapter. Application programs 811 on computing device can be downloaded to the computing device from an external computer or external storage device via a network (for example, the Internet, a local area network or other wide area networks or wireless networks) and network adapter or interface 816. From the network adapter or interface 816, the programs may be loaded into the computer readable storage media 808. The network may comprise copper wires, optical fibers, wireless transmission, routers, firewalls, switches, gateway computers and edge servers.

Computing device can also include a display screen 820, a keyboard or keypad 822, and a computer mouse or touchpad 824. Device drivers 812 interface to display screen 820 for imaging, to keyboard or keypad 822, to computer mouse or touchpad 824, and/or to display screen 820 for pressure sensing of alphanumeric character entry and user selections. The device drivers 812, R/W drive or interface 814, and network adapter or interface 816 can comprise hardware and software stored in computer readable storage media 808 and/or ROM 806.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
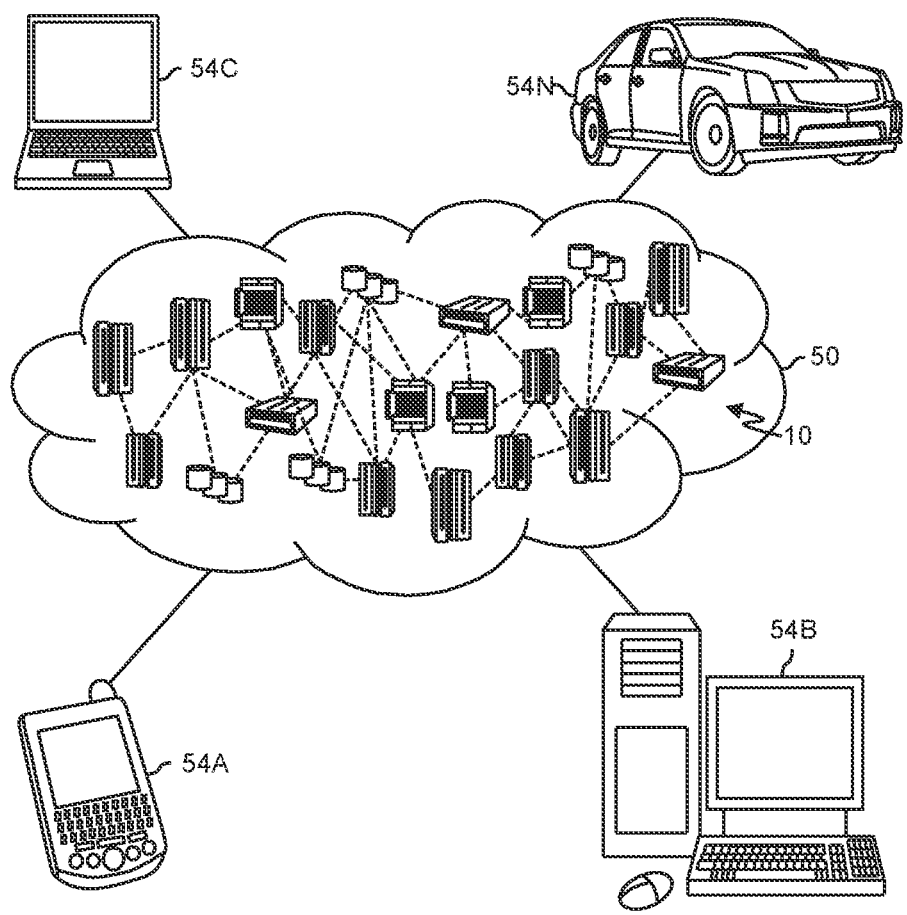
FIG. 9 is a schematic diagram of a cloud computing environment in which the described technology may be implemented.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 10:
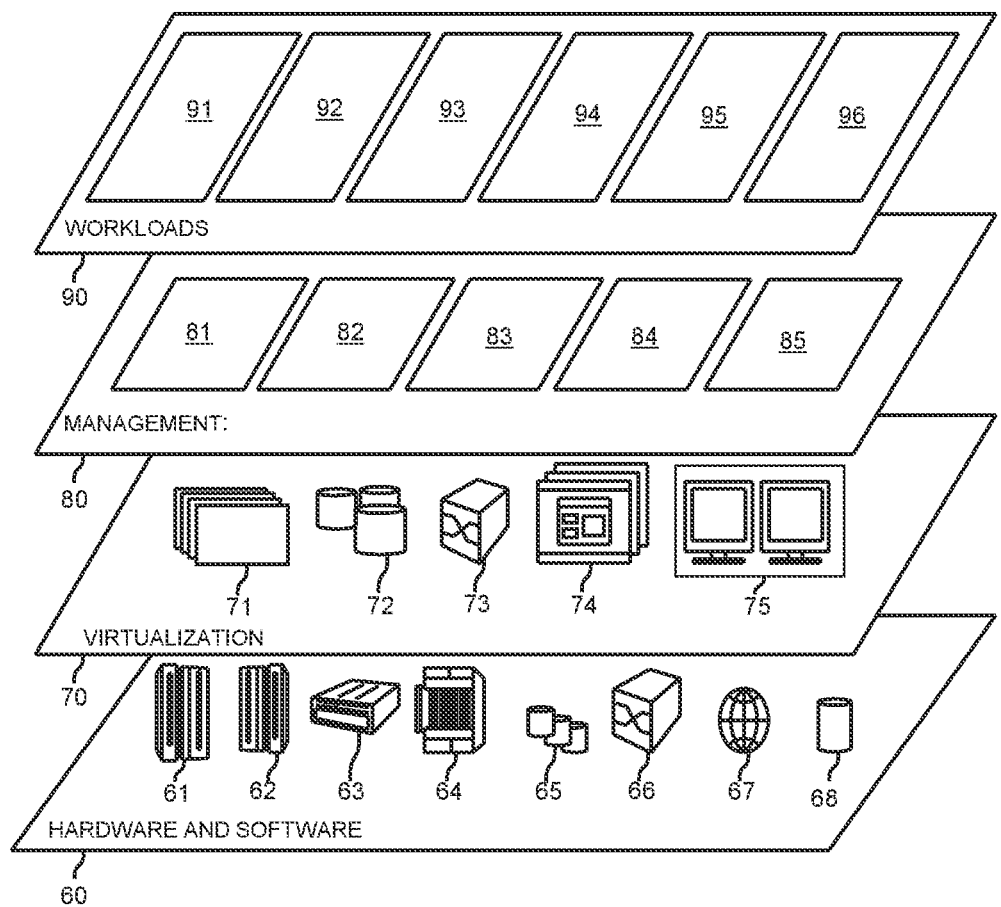
FIG. 10 is a diagram of abstraction model layers of a cloud computing environment in which the described technology may be implemented.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed query engine partitioning processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method comprising:
analyzing a sample end-user workload of queries to extract filter predicates associated with each of multiple fact tables relating to a big data store;
for each fact table:
for each column in the fact table to which a filter predicate is applied and where coarsification is required, generating a candidate partitioning expression incorporating an adjustment to a coarsification formula based on a data distribution of values in the column;
scoring the candidate partitioning expressions for each fact table based on cost data relating to the sample end-user workload, the cost data comprising processor cost; and
selecting one or more candidate partitioning expressions to optimize partitioning of each fact table with each partition data being placed in a separate directory in a distributed file system.

2. The method of claim 1, wherein generating the candidate partitioning expression comprises:
determining the coarsification formula to reduce a number of distinct values for the filter predicate;
fitting a distribution model to data values of the sample in the column; and
generating a candidate partitioning expression in a form of a combination of the coarsification formula and an equation of the distribution model.

3. The method of claim 2, wherein the coarsification formula includes converting column data types to a numeric equivalent data type suitable for applying a partitioning expression.

4. The method of claim 1, wherein scoring the candidate partitioning expressions is iterative where single partitioning expressions and compound partitioning expressions involving multiple columns are evaluated to choose an optimal partitioning expression on each fact table for the overall workload.

5. The method of claim 1, further comprising, for each column in the fact table, determining whether coarsification is required by examining a cardinality of the column to conform with a configured maximum number of partitions per fact table.

6. The method of claim 1, wherein analyzing the sample end-user workload of queries to extract the filter predicates associated with each of the multiple fact tables relating to the big data store comprises:
obtaining a detailed dissection of queries and query metadata including a structured list of filter predicates that feature in a query;
harvesting a full set of filter predicates across the workload; and
for each filter predicate, augmenting with an estimated query cost and a priority.

7. The method of claim 2, wherein fitting the distribution model to the data values of the sample in the column comprises fitting quantile statistical data with a representative mathematical model to obtain an equation that can be incorporated in the candidate partitioning expression.

8. The method of claim 2, wherein fitting the distribution model to the data values in the column comprises calculating a goodness-of-fit measure and incorporating the goodness-of-fit measure in the scoring of candidate partitioning expressions.

9. The method of claim 1, wherein the cost data is obtained by applying the candidate partitioning expressions to each of the queries across the sample end-user workload and calculating an overall cost for each query for each candidate partitioning expression.

10. The method of claim 1, further comprising:
obtaining the cost data for queries from a distributed query engine's query optimizer statistics consisting of one a selection from the group consisting of: an input/output cost and a communications cost; and configuring weightings of the cost data for scoring the candidate partitioning expressions.

11. The method of claim 1, wherein scoring the candidate partitioning expressions is based on the cost data, in combination with a priority of a query as categorized by a workload manager and a proportion of queries that benefit from the candidate partitioning expression.

12. The method of claim 1, further comprising providing a fixed name for a selected partitioning expression and providing a version label for the partitioning expression that is applied as the partitioning expression is refined.

13. The method of claim 12, wherein the partitioning expression is refined by adjusting the coarsification formula.

14. The method of claim 1, further comprising dynamically redefining a partitioning expression by determining if an existing selected partitioning expression is not meeting a configured performance target; and
invoking the automatic partitioning method to select a candidate partitioning expression for a table.

15. The method of claim 14, wherein an existing partitioning expression is determined as not meeting a configured performance target in response to the table exceeding a threshold number of partitions.

16. A computer-implemented method comprising:
for each fact table:
for each column in the fact table to which a filter predicate is applied and where coarsification is required, generating a candidate partitioning expression incorporating an adjustment to a coarsification formula based on a data distribution of values in the column;
selecting one or more candidate partitioning expressions as a partitioning scheme for a table to optimize partitioning of each fact table with each partition data being placed in a separate directory in a distributed file system;
dynamically redefining the partitioning scheme for a fact table by determining whether an existing selected partitioning expression is not meeting a configured performance target and selecting an updated partitioning scheme for the table; and
providing a version label for a selected partitioning expression that is applied as refinement by adjusting the coarsification formula occurs.

17. The method of claim 16, wherein an existing partitioning expression is determined as not meeting a configured performance target in response to a table exceeding a threshold number of partitions.

18. The method as claimed in claim 16, further comprising:
providing a fixed name for the selected partitioning expression.

19. A system comprising:
one more computer processors, one or more computer readable storage media, and program instruction collectively stored on the one or more computer readable storage media for execution by at least one of the one or more computer processors, the program instructions comprising:
program instructions to analyze a sample end-user workload of queries to extract filter predicates associated with each of multiple fact tables relating to a big data store;
program instructions to, for each fact table:
for each column in the fact table to which a filter predicate is applied and where coarsification is required, generate a candidate partitioning expression incorporating an adjustment to a coarsification formula based on a data distribution of values in the column;
program instructions to score the candidate partitioning expressions for each fact table based on cost data relating to the sample end-user workload, the cost data comprising processor cost; and
program instructions to select one or more candidate partitioning expressions to optimize partitioning of each fact table with each partition data being placed in a separate directory in a distributed file system.

20. The system of claim 19, wherein program instructions to generate the candidate partitioning expression comprise:
program instructions to determine the coarsification formula to reduce a number of distinct values for the filter predicate;
program instructions to fit a distribution model to data values of the sample in the column; and
program instructions to generate a candidate partitioning expression in a form of a combination of the coarsification formula and an equation of the distribution model.

21. The system of claim 20, wherein the coarsification formula includes converting column data types to a numeric equivalent data type suitable for applying a partitioning expression.

22. The system of claim 9, wherein program instructions to analyze the sample end-user workload of queries to extract the filter predicates associated with each of the multiple fact tables relating to the big data store comprise:
program instructions to obtain a detailed dissection of queries and query metadata including a structured list of filter predicates that feature in a query;
program instructions to harvest a full set of filter predicates across the workload; and
program instructions to, for each filter predicate, augment with an estimated query cost and a priority.

23. A system comprising:
one more computer processors, one or more computer readable storage media, and program instruction collectively stored on the one or more computer readable storage media for execution by at least one of the one or more computer processors, the program instructions comprising:
program instructions to, for each fact table:
for each column in the fact table to which a filter predicate is applied and where coarsification is required, generate a candidate partitioning expression incorporating an adjustment to a coarsification formula based on a data distribution of values in the column;
program instructions to select one or more candidate partitioning expressions as a partitioning scheme for a table to optimize partitioning of each fact table with each partition data being placed in a separate directory in a distributed file system;
program instructions to dynamically redefine the partitioning scheme for a fact table by determining whether an existing selected partitioning expression is not meeting a configured performance target and selecting an updated partitioning scheme for the table; and
program instructions to provide a version label for a selected partitioning expression that is applied as refinement by adjusting the coarsification formula occurs.

24. A computer program product comprising:
one or more computer readable storage media and program instruction collectively stored on the one or more computer readable storage media, the program instructions comprising:
program instructions to analyze a sample end-user workload of queries to extract filter predicates associated with each of multiple fact tables relating to a big data store;
program instructions to, for each fact table:
for each column in the fact table to which a filter predicate is applied and where coarsification is required, generate a candidate partitioning expression incorporating an adjustment to a coarsification formula based on a data distribution of values in the column;
program instructions to score the candidate partitioning expressions for each fact table based on cost data relating to the sample end-user workload, the cost data comprising processor cost; and
program instructions to select one or more candidate partitioning expressions to optimize partitioning of each fact table with each partition data being placed in a separate directory in a distributed file system.

25. The method of claim 1, wherein the processor cost represents cumulative processor cycles required to process a query.

* * * * *